United States Patent [19]

Martin et al.

[11] Patent Number: 4,511,067
[45] Date of Patent: Apr. 16, 1985

[54] PARTICULATE MATERIAL DISPENSING DEVICE

[76] Inventors: Ernest N. Martin, 287 Industrial St., San Marcus, Calif. 92069; William H. Barner, 969 Tia Juana St., Laguna Beach, Calif. 92651; Don M. Martin, P.O. Box 814, San Marcus, Calif. 92069

[21] Appl. No.: 527,684

[22] Filed: Aug. 30, 1983

[51] Int. Cl.$^3$ .............................................. G01F 11/24
[52] U.S. Cl. .................................... 222/230; 222/233; 222/336; 222/360; 222/368
[58] Field of Search ............... 222/230, 231, 233, 336, 222/337, 360, 368; 221/266

[56] References Cited

U.S. PATENT DOCUMENTS

| | | | |
|---|---|---|---|
| 1,554,145 | 9/1925 | Vugrenic | 222/231 |
| 1,885,979 | 11/1932 | Bobrick | 222/360 X |
| 2,585,198 | 2/1952 | Warren | 222/368 |
| 2,920,796 | 1/1960 | Field | 222/368 X |
| 3,169,675 | 2/1965 | Gutzmann et al. | 222/360 |

Primary Examiner—Joseph J. Rolla
Assistant Examiner—Frederick R. Handren
Attorney, Agent, or Firm—Georges A. Maxwell

[57] ABSTRACT

A particulate material dispenser comprising an elongate, vertically extending body defining an upwardly opening material holding compartment, an elongate, laterally extending semi-cylindrical chamber at the bottom of the body and opening upwardly into the compartment and an elongate, laterally extending vertical discharge opening with front, rear and end edges at the bottom of said chamber, an elongate rotor with a plurality of circumferentially spaced, longitudinally extending, radially outwardly projecting webs with outside edges and defining a plurality of circumferentially spaced radially outwardly opening material receiving and transporting pockets of predetermined volume, is positioned in and extends longitudinally of the chamber with the outside edges of two adjacent webs at the lower half of the rotor in sliding sealing engagement with the inside surface of the chamber adjacent the front and rear edges of the opening and with the pocket therebetween communicating with the opening, a spring is positioned in the compartment above the rotor to normally yieldingly urge the rotor down in the chamber, a drive is provided to intermittently move the spring, turn the rotor and sequentially advance the pockets into and out of communication with the opening.

19 Claims, 8 Drawing Figures

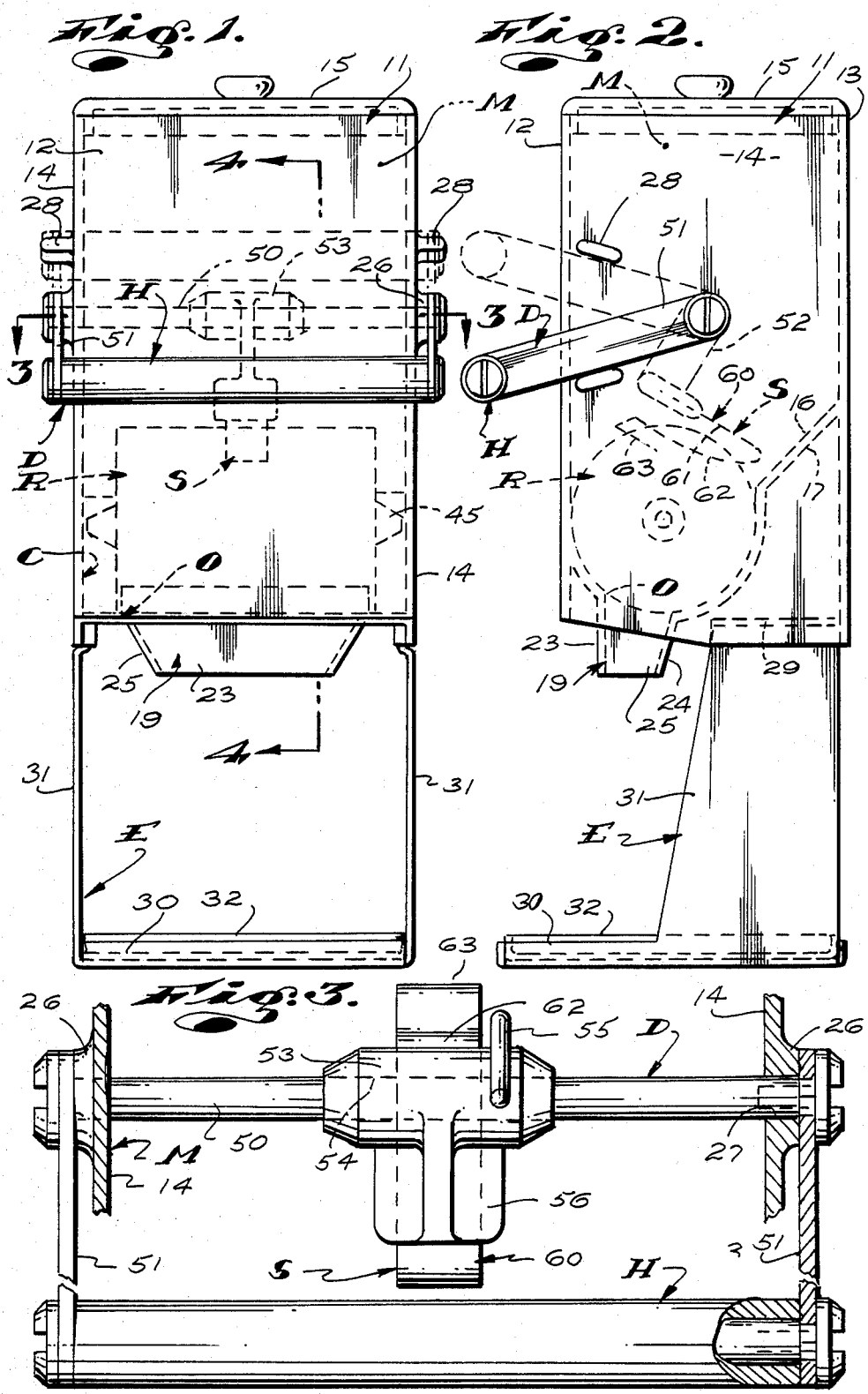

PARTICULATE MATERIAL DISPENSING DEVICE

This invention has to do with an improved dry particulate material dispenser.

Throughout the arts, there are many instances where dry particulate materials are regularly dispensed in small measured volumes for continuous and/or intermittent use. Typical of such instances include the dispensing of powdered or granulated soaps and cleansers, of dry, powdered or granulated food stuffs such as sugar and the dispensing of dry, powdered or granulated beverage concentrates such as instant tea, coffee or instant chocolate beverage.

For many years the prior art has endeavored to provide simple, inexpensive and effective mechanical dispensing means which can be effectively related to or receive and hold a supply of dry particulate material and which operate to dispense measured volumes thereof. Those mechanical dispensing means provided by the prior art are numerous and vary widely in details of construction and in mode of operation. While many prior art mechanical dispensing means have proven to be quite effective and dependable in operation, most have been found or proven to be wanting in some respect. Those prior art dispensing means which have proven to be satisfactory have, for the most part, been dispensing means which are related to industrial batching equipment or commercial, automated vending machines and the like and have been characterized by complicated structures which are costly to make and maintain.

The want and need for a very simple, inexpensive and highly effective manually operable dry particulate material dispensing structure, suitable for use in restaurants to dispense powdered chocolate beverage concentrate and the like, and for domestic use for dispensing beverage concentrates, kibbled pet food, laundry detergents and the like, have not been fully satisfied by the structures provided by the prior art. The most common shortcoming of prior art manually operable material dispensing structures for restaurant and domestic use is the tendency for the structures to become plugged up and/or fouled by the materials handled and the inability of those structures to be easily, quickly and effectively unplugged or unfouled and put back into effective service by persons having ordinary skill.

Other shortcomings of manually operable material dispensing structures provided by the prior art are to be found in or caused by the embodiment of complictated designs and mechanisms which do not lend themselves to inexpensive and cost-effective manufacture and commercial exploitation.

Most of the dry, powdered or granulated particulate materials that may be advantageously dispensed by a small and simple dispensing structure are hygroscopic in nature and are subject to moisture degradation. More particularly, when subjected to moisture, the particles thereof become sticky and such that they tend to stick to each other, creating large, obstructive masses which are difficult to reduce. Such moisture degradation of particulate materials and the tendency thereof to plug and foul dispensing structures has proven to be one of the most difficult to overcome problems confronted by the designers and manufacturers of material dispensers. In efforts to overcome the foregoing problem, it has been the apparent tendency of the prior art to provide material dispensers with special, complicated and costly structures and/or means which, it is hoped, will prevent or at least slow the advance or migration of moisture into the material being handled.

Most prior art dispensers include numbers of relatively movable parts which are bearing supported to establish fixed working clearances therebetween. Due to the fixed clearances in such dispensers, they are highly subject to being fouled and jammed by particulate that has degraded and welded together to establish large masses or lumps of material.

OBJECTS AND FEATURES OF OUR INVENTION

A principal object of our invention is to provide an improved, simple, effective and economical to make dry particulate material dispenser.

Another object and feature of our invention is to provide a material dispenser of the general character referred to which includes a small number of parts, each of which is economical to make and is such that it can be easily and quickly related with other parts of the dispenser, whereby the dispenser can be produced and sold at very low cost.

An object and feature of our invention is to provide a material dispenser of the general character referred to which is such that it can be easily and quickly disassembled to effect unplugging and cleaning any and all parts thereof, should the dispenser become fouled or otherwise need servicing.

Yet another object and feature of our invention is to provide a material dispenser of the general character referred to in the foregoing which comprises an elongate, horizontal semi-circular chamber at and communicating with the lower end of a material supply container and which has a lower material dispensing opening; an elongate, horizontal, vertically shiftable and rotatable star wheel rotor yieldingly held down in seated engagement in the chamber and operable to receive predetermined measured volumes of material from the container and to advance and discharge the measured volumes of material to the discharge opening upon incremental rotation of the rotor in the chamber; and intermittently operable drive means normally yieldingly urging and maintaining the rotor down and operating to rotate it a limited predetermined distance upon demand.

A special object and feature of the invention is to provide a dispenser of the character referred to wherein the rotor is free floating in the chamber, independent of any bearing means that might tend to bind or freeze or which would prevent movement of the rotor to clear an obstruction in its path.

The foregoing and other objects and features of our invention will be apparent and fully understood from the following detailed description of the invention, throughout which description reference is made to the accompanying drawings.

DESCRIPTION OF THE DRAWINGS

FIG. 1 is a front view of a dispenser embodying our invention;

FIG. 2 is a side view of the dispenser;

FIG. 3 is an enlarged detailed sectional view of a portion of the dispenser taken substantially as indicated by line 3—3 on FIG. 1;

DETAILED DESCRIPTION OF THE INVENTION

Figure 4:
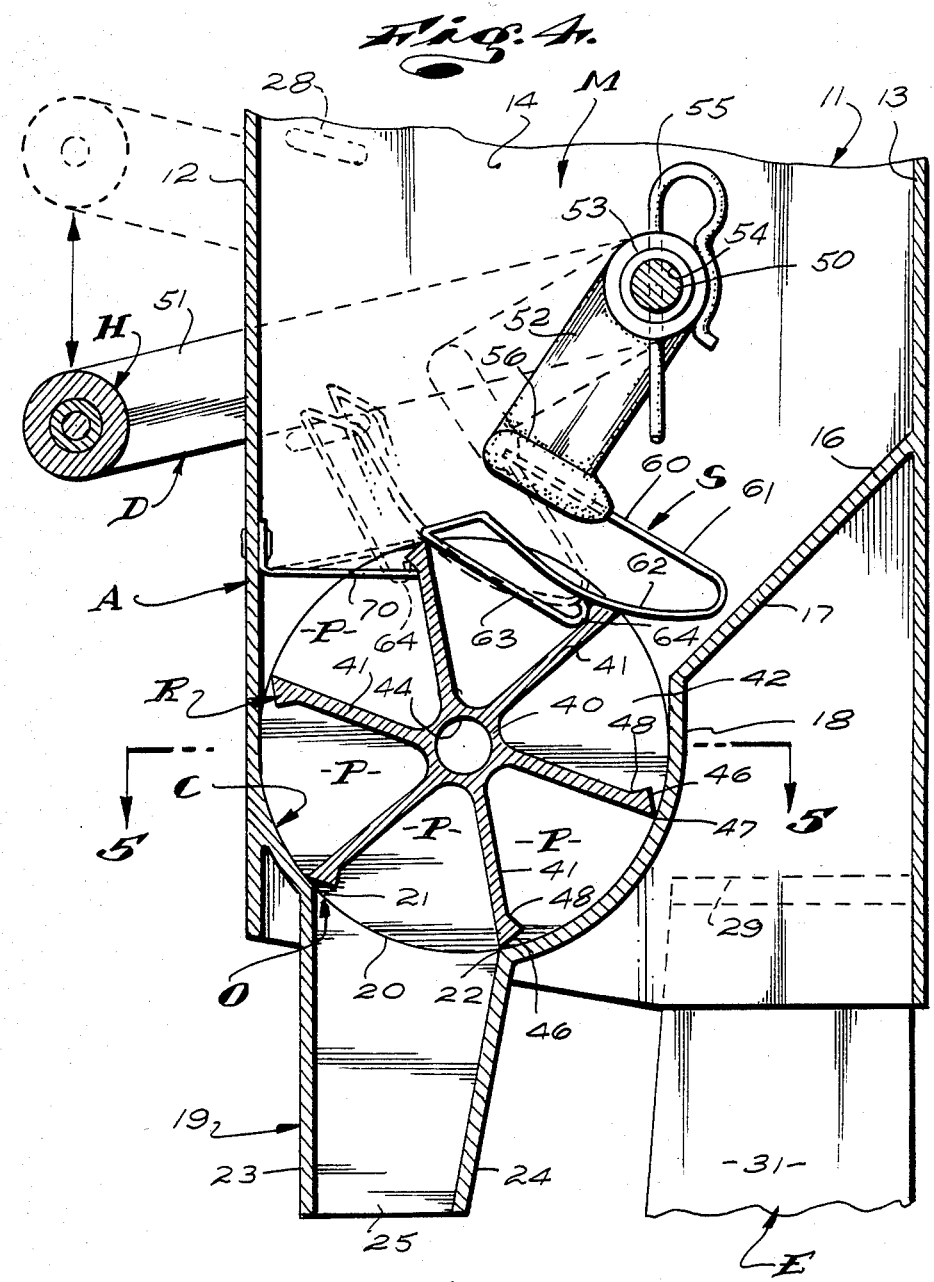
FIG. 4 is an enlarged detailed sectional view of a portion of the dispenser taken substantially as indicated by line 4—4 on FIG. 1.

Referring to the drawings, the dispenser A that we provide includes structure defining an upper particulate material supply compartment M and a lower, elongate, horizontal semi-cylindrical chamber C with an open top communicating with the compartment M and having a lower downwardly opening discharge opening O. The dispenser A next includes a material moving rotor R within the chamber C to receive material from the compartment at its top and to advance that material to the discharge opening O, through which it is dispensed, upon rotation of the rotor in the chamber. The dispenser A next includes drive means D to maintain the rotor R seated in the chamber and to incrementally rotate the rotor. In the form of the invention illustrated, the drive means D includes a shaft rotatably supported above the rotor, lever means to rotate the shaft, and spring means S carried by the shaft and engaging the rotor to normally yieldingly urge and hold the rotor down and seated in the chamber C and to rotate the rotor in the chamber upon rotation of the shaft by the lever means.

In addition to the above, and as shown in the drawings, the structure defining the chamber C and the compartment M can be provided with a counter or table-top engaging stand E to support the dispensing mechanism in spaced relationship above a counter or table-top whereby a material receiving vessel, such as a drinking glass or cup, can be set below the opening O and receive material dispensed therethrough.

In the preferred form of our invention, the compartment M and the chamber O are defined by a unitary body 11. The body 11 is an elongate, vertically extending unit with substantially vertically extending front rear and opposite side walls 12, 13 and 14 which define the compartment M.

The top of the body is open and is normally closed by a closely fitting, moisture-proof, manually removable cover 15. The lower portion of the body has a lower wall 16. The wall 16 extends between and is joined with the front, rear and side walls. The wall 16 has a rearwardly and upwardly inclined rear portion 17 and a laterally extending upwardly opening semi-cylindrical front portion 18 defining the chamber C. It is to be noted that the chamber C opens directly upwardly into and is in full open communication with the portion of the body defining the compartment M. It is to be further noted that the opposite ends of the chamber C, at the opposite sides of the body 11 are closed by the flat, vertical side walls 14 of the body 11. Accordingly, the side walls 14 of the body, as they relate to the chamber C, are the end walls thereof.

The discharge opening O at the bottom of the chamber C can be and is preferably defined by the upper open end of an elongate, vertically extending discharge duct 19 formed integrally with and depending from the forward portion 18 of the bottom wall of the body. The opening O is an elongate, laterally extending rectangular opening with straight, parallel end edges 20 spaced laterally inward from the ends of the chamber C and longitudinally extending parallel front and rear edges 21 and 22.

While the upper end of the duct 19, defining the opening O, must conform in shape with that opening, it can change in inside configuration as it depends from the chamber, as desired or as circumstances require. In the case illustrated, the duct has a vertical front wall 23 a downwardly and forwardly inclined rear wall 24, and downwardly and laterally inwardly inclined end or side walls 25, whereby the lower open end of the duct is reduced and such that material flowing down through and from the duct is most effectively directed into a cup or the like disposed beneath the duct.

It will be apparent that in the case of dispensing some materials, where special containment thereof is not required, the duct 19 can be eliminated without departing from the broader aspects and spirit of our invention.

In addition to the foregoing, the side walls 14 of the body 11 are provided with laterally outwardly projecting bearing pads 26 with aligned shaft receiving openings 27 to rotatably receive and support the opposite ends of a shaft of a means D which will hereinafter be described. The apertured pads 26 are spaced above and rearward of the chamber C.

The side walls 14 of the body 11 can be provided with pairs of vertically spaced laterally outwardly projecting stops 28 located forward of the pads 26 to cooperate with lever arms of the means D, which will hereinafter be described.

Finally, the body 11 is provided with downwardly opening slot-like recesses 29 in the lower rear portions of the side walls 14 to receive parts of the means E.

The means E is shown as including a flat, horizontal rectangular counter-top engaging base 30 with laterally spaced flat, upwardly projecting legs 31. The upper ends of the legs 31 are frictionally engaged and seated in the recesses 29 in the body 11. The base plate is formed to cooperatively receive and retain a drip tray 32. With the means E shown and described, it will be apparent that the body 11 is stably supported above a related counter-top or the like and the drip tray 32 is positioned below the lower open end of the duct 19 to effectively support a cup or the like below said duct and to receive material discharged therefrom.

The form and construction of the means E can vary widely and in some instances, the means E can be dispensed with, without departing from the broader aspects and spirit of our invention.

The rotor R which is rotatably seated in the chamber C is an elongate star wheel type unit. The rotor is substantially cylindrical in nature, with an outside diameter which is substantially equal to the inside diameter of the chamber C. The rotor R is characterized by a central, longitudinally extending hub 40 and a plurality (6) of circumferentially spaced radially outwardly projecting plate-like webs 41. The adjacent webs 41 of the rotor cooperate to define a plurality of circumferentially spaced radially outwardly opening V-shaped channels which, when closed at their opposite ends, define radially outwardly opening material transporting pockets P of predetermined volumetric extent.

In the form of the invention shown in FIGS. 1 through 5 of the drawings, the V-shaped channels defined by the webs 41 are closed at their ends by flat, radially extending disc-like end walls 42 positioned at the opposite ends of the rotor and which are parts of a rotor assembly. The end walls 42 are substantially equal in diameter than the major diameter of the star wheel.

In the form of the invention illustrated, the end walls 42 have central longitudinally inwardly projecting pins 43 rotatably engaged in into openings 44 in the ends of the hub 40, whereby the walls 42 are rotatable relative to the rotor. Further, the end walls 42, if spaced a substantial distance from the end walls of the chamber C, can be provided with central longitudinally outwardly projecting bearings 45 in the form of truncated conical protruberances with outer bearing surfaces 45'. The bearing surfaces 45' oppose and engage the inside surfaces of the side walls 14 of the body 11 to maintain the rotor positioned centrally within the chamber C, between the opposite ends thereof and above the discharge opening O.

The webs 41 of the rotor are preferably at least equal in longitudinal extent with the longitudinal extent of the discharge opening O and the circumferential distance between the outer edges of adjacent webs 41, that is, the lateral extent of the open sides of the pockets defined by the webs and end walls are preferably substantially equal to the lateral extent of the discharge opening O. In practice, to provide for desired free working and movement of the rotor R within the chamber C and relative to the opening O, the major longitudinal and lateral extent of the pockets P defined by the webs 41 and end walls 42 is slightly greater than the longitudinal and lateral extent of the opening O.

In the preferred carrying out of our invention, the webs 41 of the rotor are formed with longitudinally extending enlargements at their outer edge portions. The enlargements have flat, substantially radially outwardly disposed lands 46 which are angularly related to the radial plane of the webs to extend slightly radially outwardly in the direction of rotation of the rotor and which converge with related radial surfaces of the webs to define sharp straight outer edges 47 along the outer edges of the webs. The edges 47 function to establish uniform sliding and working engagement on and with the cylindrical inside surface of the chamber C. When the rotor is rotated or advanced forwardly in a clockwise direction (see FIG. 4 of the drawings).

For the purpose of this disclosure and referring to FIG. 4 of the drawings, the rotor R advances or rotates in a clockwise direction. Therefore, the upper portion of the rotor advances upwardly, rearwardly and downwardly and the lower portion of the rotor advances downwardly, forwardly and upwardly, when the dispenser is operated.

In accordance with the above, and as shown in FIG. 4 of the drawings, the edges 47 are advancing or leading edges on the webs.

In addition to the foregoing, the enlargements at the outer edge portions of the webs 41 have portions which project from the trailing surfaces or sides of the webs and which have surfaces which are angularly related to the radial planes of the webs to define radially inwardly and counter-clockwise disposed trailing stop surfaces or shoulders 48 at the outer edges of the webs.

In practice, if desired, the enlargements at the outer edges of the webs can be eliminated. In such a case, the lands 46 are not so extensive in surface area and the trailing stop surfaces 48 could be established by recesses formed in the trailing surfaces of the webs or might be defined by separate parts fixed to the webs.

Figure 6:
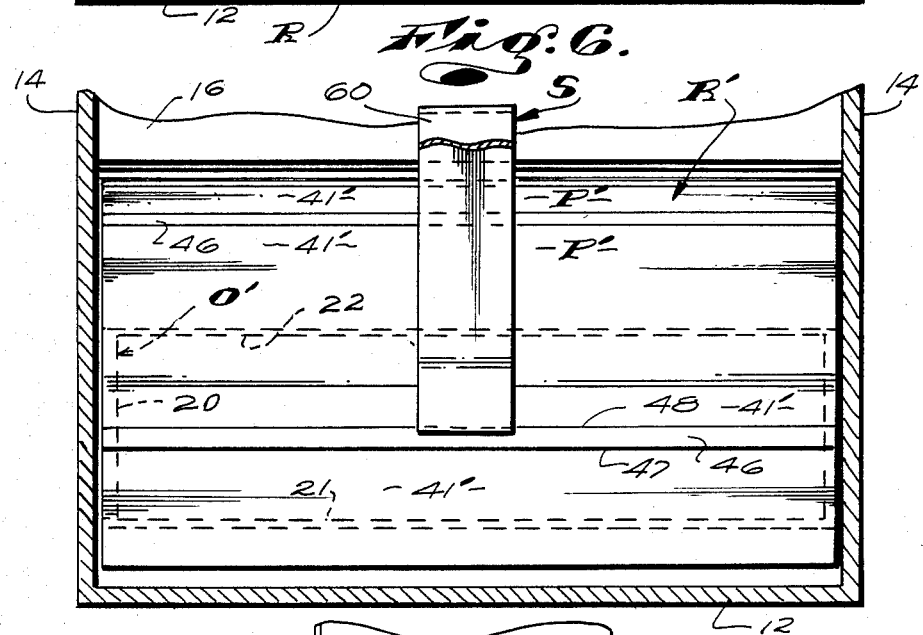
FIG. 6 is a view similar to FIG. 5 showing another embodiment of our invention.

In FIG. 6 of the drawings, we have shown another embodiment of our invention in which the rotor R' has no end walls. In this form of the invention, the ends of the webs 41' are in wiping engagement or in close running clearance with the side walls 14 of the body 11. Thus, the side walls 14 of the body 11 serve to close the ends of the troughs or channels defined by the webs 41' and thereby establish the pockets P'. Accordingly, the side walls 14 of the body 11 at the ends of the chamber serve the function of the end walls 42 in the first form of the invention, thus simplifying the dispenser construction and materially reducing the manufacturing costs thereof.

The rotor R, whether in the form shown in FIGS. 1 through 5 or in FIG. 6 of the drawings, is engageable in the body 11 through the open top thereof and is lowered into seated engagement in the chamber C with its longitudinal axis substantially concentric with the longitudinal axis of the chamber and with the edges 47 of the webs 41, opposing the inside surfaces of the chamber, in sliding wiping engagement therewith. When the rotor is in normal static position, the pocket P of the rotor between and defined by the two lowermost webs 41 opens downwardly and is in register with the opening O, whereby material previously deposited in and carried by that pocket is free to drop down from within the pocket through the opening O and thence through and from the duct 19. The outer edge 47 of the leading or foremost of the two lowermost webs 41 engages the inside surface of the chamber adjacent the forward side 21 of the opening O and the outer edge 47 of the trailing or rearmost of the two lowermost webs 41 engages the inside surface of the chamber C adjacent the rear edge 22 of the opening O. Thus, the two noted edges 47 of the rotor normally seal off the opening O at and along the opposite front and rear longitudinal sides thereof.

In the first form of the invention, wherein the rotor R includes end walls 42, the peripheral edges of the end walls 42 seat on and seal with the inside surfaces of the chamber C adjacent the opposite ends 20 of the opening O.

If the rotor is that form of rotor shown in FIG. 6 of the drawings, the ends of the opening O' extend to or are close to the side walls 14 of the body, at the ends of the chamber C' and the ends of the rotor webs 41' preferably slidably engage and effectively seal with the inside surface of the walls 14.

In accordance with the foregoing, whichever form of rotor is employed, the rotor normally seals with the inside surfaces of the chamber C about the perimeter of the opening O with the lowermost downwardly opening pocket P in registered open communication with the opening O.

It will be noted that some of the pockets P about the upper half of the rotor are disposed upwardly in full open communication with the compartment M and that other of those pockets are partially open to said compartment. Accordingly, material in the compartment M is free to drop into and fill each of the pockets at the top half of the rotor as said pockets are advanced upwardly, rearwardly and downwardly during operation of the dispenser.

It will be further apparent that upon rotating the rotor clockwise, a distance equal to the circumferential distance between adjacent webs or through an angle equal to the angle between the adjacent webs, the downwardly opening emptied pocket P of the rotor is moved forwardly and upwardly and the next trailing and filled pocket P is moved downwardly and forwardly into register above the opening O whereby the material therein is dropped or flows down through the opening O as and after that pocket is advanced to its new position. Coincidental with the above noted operation of the contruction, other pockets P of the rotor R move upwardly, rearwardly and downwardly in and below the material in the compartment M and are filled with that material.

The weight of the material above the rotor R and the weight of the rotor itself tend to maintain the rotor down and in seated engagement in the chamber C, but not with sufficient force and/or surety to prevent material from collecting and/or sticking on and with the inside surface of the chamber and which would cause the rotor to float or ride up on that material and within the chamber. Should the rotor R ride or float up in the chamber C, the effective operation of the dispenser would necessarily be adversely affected.

The drive means D that we provide includes the spring means S which normally yieldingly urges and holds the rotor down in the chamber C with the edges 47 of the lower webs 41 in pressure sliding and sealing engagement with the interior surface of the chamber C. The spring means S eliminates the possibility of the rotor permanently rising or floating up in the chamber C, yieldingly maintains the rotor down into sealing engagement with the interior of the chamber about the discharge opening O and urges the eges 47 of the rotor webs into engagement with the inside surface of the chamber C with sufficient force so that the webs effectively scrape and/or wipe the surface of the chamber C free of any material that might have become stuck thereto during operation of the dispenser.

The seal established by the rotor about the dispensing opening O is substantially moisture-proof. That is, the seal stops the free movement of moisture up through the opening O and into the interior of the dispenser and so limits the migration of moisture in the construction that notable moisture degradation of the material handled is not likely to occur during normal use of the dispenser.

The spring means S is a part of the drive means D and, in addition to holding the rotor down, operates to releasably engage the webs 41 of the rotor and move the rotor clockwise, upon operation of the means D.

The means D includes an elongate transversely extending shaft 50 positioned within and extending transverse the compartment M of the body 11. The shaft 50 has opposite end portions engaged in and through the openings 27 of the bearing pads 26 at the side walls of the body. The shaft 50 is parallel with and spaced above and rearward of the rotor R. In the form of the invention illustrated, the means D next includes a pair of laterally spaced elongate substantially horizontally disposed lever arms 51 at the exterior of the body, at the opposite sides thereof. The lever arms 51 have rear ends drivingly coupled with related opposite ends of the shaft 50 and front ends fixed to the opposite ends of an elongate, horizontal transversely extending handle H spaced forward of and extending transverse the front wall 12 of the body. The arms 51 project forwardly from the shaft between the pairs of vertically spaced stops 28 on the side walls 14 of the body. The arms are normally in a down position where they stop on the lower stops 28 and are manually pivoted up to stop against the upper stops 28 and thence back to their normal stop position by manually lifting and lowering the handle H. In practice, a return spring means (not shown) can be engaged with and between the body and lever arms or shaft to normally yieldingly maintain the drive means with the lever arms in their up position.

The means D next includes an elongate crank 52 drivingly carried by the shaft 50, intermediate the ends thereof and depending therefrom into the compartment M. The crank 52 terminates in the compartment M above the chamber C and rotor R.

The upper end of the crank has a cylindrical enlargement 53 with an opening 54 through which the shaft 50 is slidably engaged. The enlargement 53 and shaft 50 have registering openings through which a resilient lock pin unit 55 is releasably engaged to establish rotary driving engagement between the crank and the shaft.

The lower front end of the crank is formed with a head 56 which engages or in which an end of a spring 60 of the spring means S is securely engaged.

It will be noted that upon manual operation of the means D and rotation of the shaft 50 from and to its normal rotative position, the crank 52, its head 56 and the spring 60 carried thereby pivot and move forwardly and upwardly and thence downwardly and rearwardly in the compartment M and function to agitate and cause the material in the compartment to move and flow down and into the upwardly opening pockets P in the rotor R.

The spring 60 is formed of an elongate strip of flat ribbon spring metal and has a substantially horizontal upper portion 61 with a front end engaged in or otherwise fixed to the head 56 on the crank 52. The upper portion 61 projects rearwardly from the head 56. The spring next includes an elongate central portion 62 with a rear end joined integrally with the rear end of the upper portion 61 and has a lower portion 63 depending from the front end of the central portion and turned to extend rearwardly in spaced relationship below the front end portion of the central portion. The lower portion terminates to define a rearwardly disposed web engaging end 64. In the case illustrated, the end 64 is recurved to define a smooth, rounded web engaging surface.

The central portion 62 of the spring 60 has a convexly curved downwardly disposed bottom surface and is held down in the compartment M by the upper portion 61 and by the crank so that its central portion normally yieldingly engages the outer edge of a rearwardly and upwardly projecting web 41 of the rotor, between the ends of that web. The central portion 62 of the spring normally yieldingly urges the rotor down into working engagement in the chamber C. The rear end 64 of the lower portion 63 of the spring engages the stop shoulder 48 on the above noted web 41 and the foremost portion of the lower portion 63 engages the outer edge of the next forward or advancing web 41, that is, the web trailing the web engaged by the central portion 62 of the spring (as clearly shown in FIG. 4 of the drawings).

Upon forward and upward pivotal movement of the crank and the spring, the lower portion 62 of the spring shifts forwardly, moving its end 64 from engagement with the stop shoulder 48 on its first engaged web. As the spring moves forwardly and upwardly, the lower portion thereof is biased rearwardly and upwardly and slides up and over the outer edge of the next trailing web 41, until the end 64 thereof moves beyond that edge. Thereafter, the lower portion of the spring is unbiased and moves downwardly. Upon subsequent downward and rearward pivotal movement of the crank and spring, the end 64 of the spring engages the stop shoulder 48 of said trailing web and moves that web rearwardly, rotating the rotor clockwise. When the crank and spring have moved or returned to their normal position, the rotor will have rotated a distance equal to the circumferential extent of one pocket P and the material in and carried by that pocket advanced into register with the opening O will drop from that pocket through the opening O and thence through and from the duct 19.

When the spring 60 moves forwardly and upwardly as noted above and the lower portion 63 thereof commences to slide up and over the said trailing web of the rotor, the central portion 62 of the spring will move from engagement from its first related web of the rotor and will establish engagement with the said trailing web of the rotor as the crank and spring return to their normal position. When and as the foregoing occurs, it will be apparent that the lower portion of the spring continues to maintain engagement with said trailing web to hold the rotor down in the construction, as desired.

In practice, upon forward and upward movement of the spring 60, the spring might rotate the rotor counterclockwise a limited distance if the frictional drag between the rotor and chamber is too little. If such counterclockwise rotation of the rotor is sufficiently limited, it will only operate to back up an already empty pocket P relative to the dicharge opening O and no adverse effects will result therefrom.

If reverse rotation or backing up of the rotor R is sufficient to create problems, such rotation can be effectively prevented by a leaf-spring stop 70 such as is shown in FIG. 4 of the drawings. The stop spring 70 is fixed to and projects rearwardly from the front wall 12 of the body 11 to normally engage the stop shoulder 48 on the web which is next to be engaged by the end 64 of the spring 60 and is laterally offset in non-interfering relationship with the spring S. The stop spring 70 is such that it is easily deflected up in advance of the webs advanced into engagement therewith.

Figure 7:
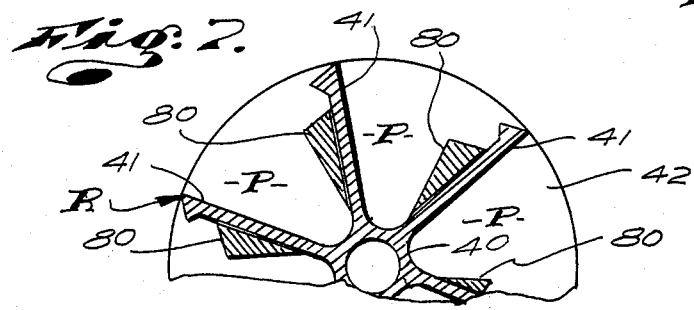
FIG. 7 is a view of a portion of a rotor with novel volume adjusting means related to it.
Figure 5:
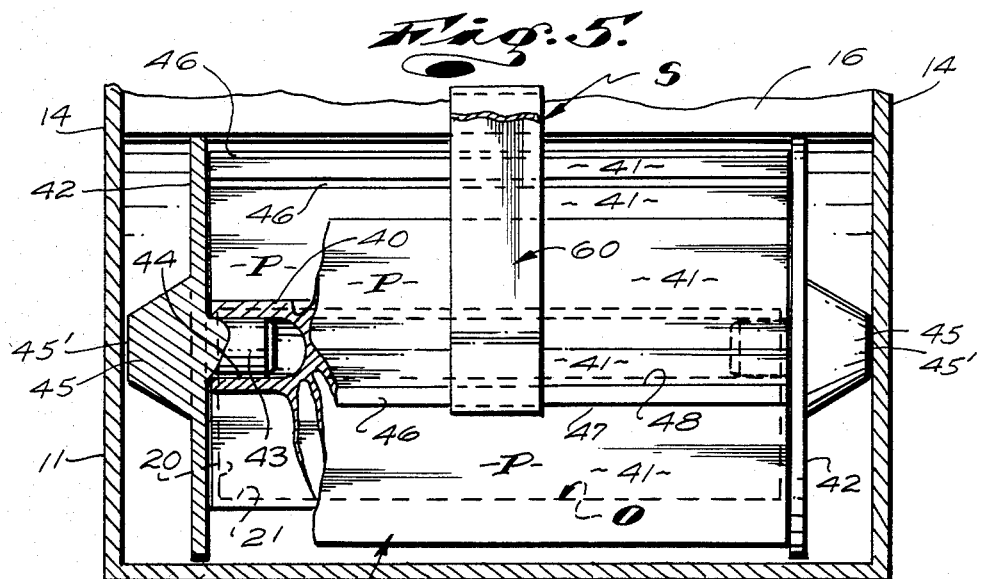
FIG. 5 is a sectional view taken substantially as indicated by line 5—5 on FIG. 4.

With the construction illustrated and described above, the volumetric extent of each pocket P of the rotor R is equal to a predetermined measure of material to be dispensed. If it is likely that the volume of material to be dispensed is to be varied, the volume of the pockets P is made to equal the largest volume of material likely to be dispensed and filler blocks 80, such as are shown in FIG. 7 of the drawings, can be engaged in the pockets P to reduce the effective volume of the pockets, as desired. The blocks 80 can be set and held in the pockets by means of pressure sensitive adhesives or by some suitable mechanical holding or fastening means, as desired or as circumstances require.

In normal operation of the first described form of our invention, it has been observed that the end walls 42 of the rotor unit tend to statically seat and seal in the chamber C at the opposite ends of the rotor and adjacent the ends of the opening O. The rotor R turns relative to the end walls 42 when the spring means S and operating means D are actuated. When, for example, the rotor is caused to be displaced from its normal working position within the chamber C by an abnormal obstructive lump of particulate material or the like, the end walls 42 move to accommodate such displacement of the rotor and often rotate to some degree therewith. When the obstructive lump has passed, the rotor unit, under the weight of material acting thereon, and under the force of the spring means S, reassumes its normal working position in the chamber C. Accordingly, the end walls 42 are bearing parts on the rotor which are free floating and self-aligning with respect to the structure defining the chamber C. Thus, upon momentary misalignment of the rotor R in the chamber C, the bearing support afforded thereto by the end walls 42 will not bind or lock and prevent desired rotation of the rotor.

The above structure is to be distinguished from any other structure of somewhat similar nature where the rotor is shaft and/or bearing supported on a fixed axis within its related chamber and wherein the rotor, shaft or bearings cannot move from their fixed axes without resulting in binding and freezing up of the construction.

In the form of the invention shown in FIG. 6 of the drawings, wherein the rotor R' has no end walls; when it is desired to remove and clean the rotor R', it is only necessary to rotate the crank 52 of the means D and the spring means S so that the crank and spring means occur upward and rearward of the shaft 50. Upon repositioning the crank and spring means, as noted above, the rotor can be manually lifted from within the body 11 (rotating it by the shaft 50). Subsequent to cleaning the rotor (and the interior of the body), the rotor can be dropped back into the body and the crank and spring means returned to their normal working position. Rotating and positioning the crank and spring means to allow for removal of the rotor can be effected by pulling the pin 55 of the means D or can be effected by engaging the handle H and manually urging the lever arms 51 upwardly over the stops 28 on the body and thence rearwardly to reposition the crank and spring means as required.

In the form of the invention where the rotor R is provided with end walls 42, similar removal and replacement of the rotor R can be made possible by moving the front wall 12 of the body forwardly and/or moving the shaft 50 rearwardly to allow for movement of the end walls 42 therebetween.

While the location and proportioning of parts in the drawings do not provide for removal of the rotor R in the manner suggested above, repositioning and reproportioning of appropriate parts of the construction to make such removal of the rotor possible can be easily effected without the exercise of any special skills and without in any way affecting the broader aspects and spirit of our invention.

Figure 8:
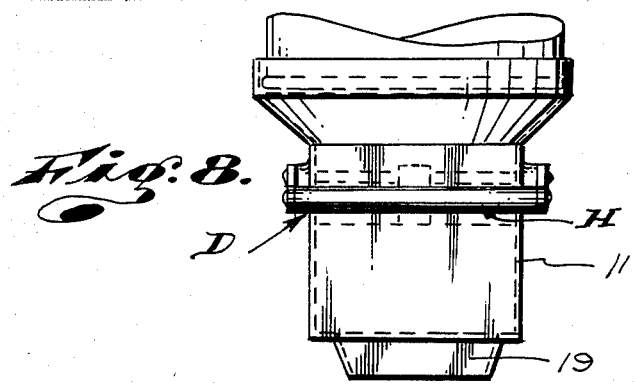
FIG. 8 is a view of a modified form of the invention.

As shown in FIG. 8 of the drawings, the upper open end portion of the body 11' of the dispenser can be formed to cooperatively receive and carry a cardboard container, can or other material handling container. In such a case, the material handling container set in the body 11' is opened at its lower end to allow for the free movement or flow of material in the container into the compartment of the dispenser, above the chamber and the rotor therein. This modified form of the invention is shown to illustrate the fact that the dispenser that we provide can be effectively related with various kinds and forms of structures holding supplies of material to be dispensed, without departing from the broader aspects of our invention.

Finally, while we have shown and described the drive means D as a manually operable means including a shaft which carries the spring means S; lever arms and an operating handle; it will be apparent that the spring means S can be suitably and effectively moved forwardly and rearwardly relative to the rotor R by various other mechanical means, without altering or varying the basic construction and relationship of the spring means, rotor and body. For example, the spring means of our invention can be carried by the armature of an electro-mechanical solenoid and shifted forwardly and rearwardly within the body and relative to the rotor upon momentary energizing of the solenoid.

Having described only typical preferred forms and applications of our invention, we do not wish to be limited to the specific details herein set forth but wish to reserve to ourselves any modifications and/or variations that might appear to those skilled in the art and which fall within the scope of the following claims:

Having described our invention, we claim:

1. A particulate material dispenser comprising an elongate, vertical body with front, rear and side walls, a bottom wall and defining an upwardly opening material holding compartment, an elongate, laterally extending semicylindrical chamber at the bottom wall and opening upwardly into the compartment, an elongate, laterally extending vertical discharge opening with front, rear and end edges at the bottom of said chamber, an elongate rotor with a plurality of circumferentially spaced, longitudinally extending, radially outwardly projecting webs with outside edges and defining a plurality of circumferentially spaced radially outwardly opening material receiving and transporting pockets of predetermined volume, said rotor is positioned in and extends longitudinally of the chamber with the outside edges of two adjacent webs at the lower half of the rotor in sliding sealing engagement with the inside surface of the chamber adjacent the front and rear edges of the opening and with the pocket therebetween communicating with said opening, spring means normally yieldingly urging the rotor down in the chamber and intermittently operable to rotate the rotor to sequentially advance the pockets into and out of communication with the opening and including an elongate spring positioned above the rotor and having a lower rear end in driving engagement with a trailing side of a substantially upwardly projecting leading web, a forward portion engaging the outside edge of a next trailing web, an intermediate portion releasably engaging the outer edge of said leading web and yieldingly urging the rotor down in the chamber and an upper portion, drive means connected with the upper portion and operating to move the spring forwardly and to move its rear end from engagement with said leading web into engagement with said trailing web and to move the spring rearwardly and drive said trailing web rearwardly and rotate the rotor to move the pocket rearward of and adjacent the pocket communicating with said opening into communication with said opening.

2. The particulate material dispenser set forth in claim 1 which further includes a stop part carried by the body and normally releasably engaging the trailing side of a web on the rotor and preventing counter rotation of said rotor.

3. The particulate material dispenser set forth in claim 1 wherein the drive means includes a shaft rotatably carried by the body in spaced parallel relationship above the rotor, a crank arm projecting from the shaft and connected with the upper portion of said spring and an operating lever arm at the exterior of the body and connected with said shaft.

4. The particulate material dispenser set forth in claim 2 wherein the drive means includes a shaft rotatably carried by the body in spaced parallel relationship above the rotor, a crank arm projecting from the shaft and connected with the upper portion of said spring, and an operating lever arm at the exterior of the body and connected with said shaft.

5. The particulate material dispenser set forth in claim 1 wherein the ends of the chamber are defined by said side walls of the body, said webs have end edges in substantial sealing engagement with said side walls.

6. The particulate material dispenser set forth in claim 2 wherein the ends of the chamber are defined by said side walls of the body, said webs have end edges in substantial sealing engagement with said side walls.

7. The particulate material dispenser set forth in claim 3 wherein the ends of the chamber are defined by said side walls of the body, said webs have end edges in substantial sealing engagement with said side walls.

8. The particulate material dispenser set forth in claim 4 wherein the ends of the chamber are defined by said side walls of the body, said webs have end edges in substantial sealing engagement with said side walls.

9. The particulate material dispenser set forth in claim 1 wherein the ends of the chamber are closed by laterally spaced walls with opposing surfaces, said rotor has end walls with cylindrical edges slidably sealingly engaging the interior surface of the chamber and longitudinally outwardly disposed bearing surfaces slidably engaging said opposing surfaces.

10. The particulate material dispenser set forth in claim 2 wherein the ends of the chamber are closed by laterally spaced walls with opposing surfaces, said rotor has end walls with cylindrical edges slidably sealingly engaging the interior surface of the chamber and longitudinally outwardly disposed bearing surfaces slidably engaging said opposing surfaces.

11. The particulate material dispenser set forth in claim 3 wherein the ends of the chamber are closed by laterally spaced walls with opposing surfaces, said rotor has end walls with cylindrical edges slidably sealingly engaging the interior surface of the chamber and longitudinally outwardly disposed bearing surfaces slidably engaging said opposing surfaces.

12. The particulate material dispenser set forth in claim 4 wherein the ends of the chamber are closed by laterally spaced walls with opposing surfaces, said rotor has end walls with cylindrical edges slidably sealingly engaging the interior surface of the chamber and longitudinally outwardly disposed bearing surfaces slidably engaging said opposing surfaces.

13. The particulate material dispenser set forth in claim 1 wherein the webs are formed with stop shoulders to engage the rear end of the spring and normally stop radial outward shifting of said end of the spring relative to the webs.

14. The particulate material dispenser set forth in claim 2 wherein the webs are formed with stop shoulders to engage the rear end of the spring and normally stop radial outward shifting of said end of the spring relative to the webs.

15. The particulate material dispenser set forth in claim 3 wherein the webs are formed with stop shoulders to engage the rear end of the spring and normally stop radial outward shifting of said end of the spring relative to the webs.

16. The particulate material dispenser set forth in claim 4 wherein the webs are formed with stop shoulders to engage the rear end of the spring and normally stop radial outward shifting of said end of the spring relative to the webs.

17. The particulate material dispenser set forth in claim 5 wherein the webs are formed with stop shoulders to engage the rear end of the spring and normally stop radial outward shifting of said end of the spring relative to the webs.

18. The particulate material dispenser set forth in claim 9 wherein the end walls are rotatably carried by the rotor and have flat inner surfaces in sliding sealing engagement with end edges of the webs.

19. The particulate dispenser set forth in claim 18 wherein the ends of the rotor have axially outwardly opening central openings and said end walls have central axially inwardly projecting pins slidably engaged in said central openings.

* * * * *